C. AALBORG.
TROLLEY.
APPLICATION FILED APR. 18, 1917.

1,384,418.

Patented July 12, 1921.
2 SHEETS—SHEET 1.

WITNESSES:
R. J. Fitzgerald.
W.C.McCoy.

INVENTOR
Christian Aalborg.
BY
Wesley G. Carr
ATTORNEY

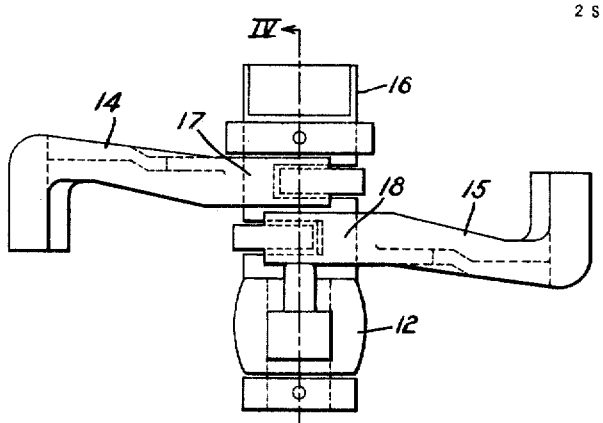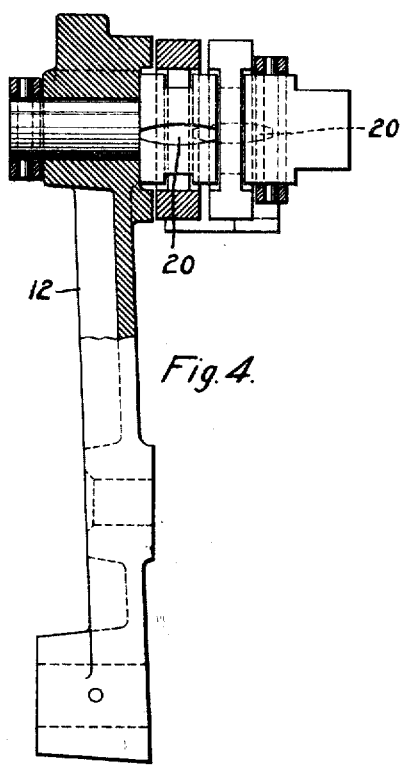

UNITED STATES PATENT OFFICE.

CHRISTIAN AALBORG, OF WILKINSBURG, PENNSYLVANIA, ASSIGNOR TO WESTINGHOUSE ELECTRIC & MANUFACTURING COMPANY, A CORPORATION OF PENNSYLVANIA.

TROLLEY.

1,384,418.  Specification of Letters Patent.  Patented July 12, 1921.

Application filed April 18, 1917. Serial No. 162,998.

*To all whom it may concern:*

Be it known that I, CHRISTIAN AALBORG, a citizen of the United States, and a resident of Wilkinsburg, in the county of Allegheny and State of Pennsylvania, have invented a new and useful Improvement in Trolleys, of which the following is a specification.

My invention relates to pantograph trolleys, and it has for its object to provide a trolley in which the contact pressure may be materially changed, under certain operating conditions.

Heretofore, it has been found that a deposit of sleet or ice on a trolley wire occasions considerable difficulty in the collection of current and results in pitting the current collector and burning the trolley wire. It has also been found that these difficulties may be overcome by materially increasing the contact pressure of the current-collecting shoe.

According to my invention, I provide fragmentary means associated with the elevating springs by which the contact pressure on the trolley shoe may be materially changed when sleet or ice on the trolley wire renders this necessary.

Figure 1:
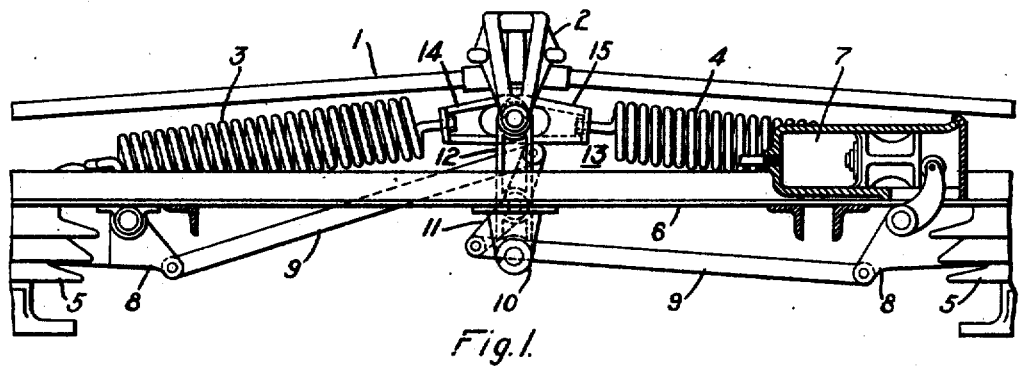
Figure 2:
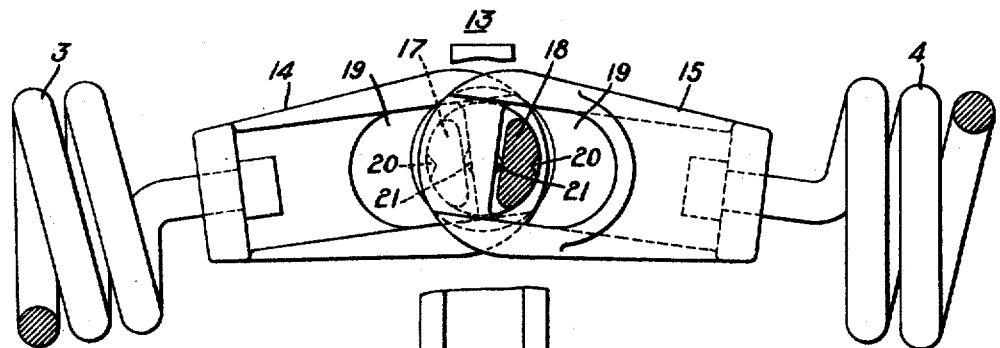
Figure 2:
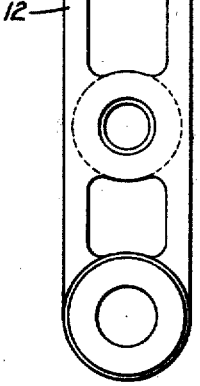

Figure 1 is a side elevational view, partially in section, of a pantograph trolley constructed in accordance with my invention; Fig. 2 is an enlarged fragmentary view of a portion of the trolley shown in Fig. 1; Fig. 3 is a top plan view of the device shown in Fig. 2; and Fig. 4 is an end sectional view, taken on line IV—IV of Fig. 3.

The trolley illustrated in the accompanying drawing is of a familiar type comprising a pantograph frame 1 that is provided with a current-collecting shoe 2 and a plurality of elevating springs 3 and 4 which are adapted to raise the trolley 1 in any convenient manner. The trolley 1 is supported by insulators 5 and a frame 6, upon which a trolley-lowering device 7 is also mounted. The lower portions of the pantograph frame 1 are provided with arms 8 which are connected by a set of levers 9 to apply the lowering pressure from the device 7 to both sections of the pantograph frame.

The set of levers 9 is mounted upon a bracket 10 to which are also secured the elevating springs 3 and 4. The central arm 11 of the set of levers 9 is pivotally mounted upon an upright arm 12, which, in turn, is pivotally mounted upon the bracket 10.

An improved form of spring-tensioning device 13 is mounted upon the upper end of the arm 12 and serves to connect the adjacent ends of the springs 3 and 4. The spring-tensioning device 13 comprises link members 14 and 15 which are mounted upon an eccentric shaft 16 that is adapted to be turned, in a convenient manner, to shorten the distance between the extreme ends of the links 14 and 15 and, since these links join the adjacent ends of the springs 3 and 4, this action increases the tension of the springs 3 and 4. The shaft 16 is mounted upon the arm 12 and is provided with oppositely disposed cam members 17 and 18, around which the members 14 and 15 are respectively disposed. Each of the link members 14 and 15 is provided with an aperture 19 that is sufficiently large to permit the complete rotation of the cam members 17 and 18 therein. Each of the cam members 17 and 18 is provided with a notch 20 with which projections 21 on the link members 14 and 15 are respectively adapted to engage to prevent the unintentional rotation of the shaft 16. The end of the shaft 16 is provided with a polygonal portion by which the shaft may be rotated.

During normal operation of a trolley constructed in accordance with my invention, the spring-tensioning device 13 occupies the position shown in Fig. 2, but if, by reason of sleet or ice collecting upon the trolley conductor, it is desired to increase the contact pressure of the trolley shoe, the shaft 16 of the spring-tensioning device is rotated through substantially 180°, or until the cams 17 and 18 change relative positions. This materially shortens the distance between the extreme ends of the link members 14 and 15 and increases the tension on the elevating springs 3 and 4. The shaft 16 is locked in this operative position by the engagement of the projections 21 with the notches 20.

Although I have illustrated and described my invention as applied to a pantograph trolley employing two elevating springs, it may obviously be employed with other types of trolleys, for example, those in which only a single spring is used, without departing from the spirit and scope of my invention, as set forth in the appended claims.

I claim as my invention:

1. The combination with a pantograph trolley, of springs adapted to elevate said trolley, linkage members connecting the adjacent ends of said springs, and a cam member connecting said linkage members and adapted to readily decrease the distance between said linkage members.

2. The combination with a trolley, of a pair of actuating springs each having one of its ends connected to an adjusting member in spaced relation to the other spring, said adjusting member being mounted for rotation in a direction to vary the tension of the springs.

3. The combination with a pantograph trolley, of a plurality of elevating springs, a link connected to each of said springs, and an eccentric cam shaft interposed between said links and adapted to shorten the distance between the points of connection to said springs.

4. The combination with a trolley, of a pair of actuating springs each having one of its ends connected to an adjusting member in spaced relation to the other spring, said adjusting member being mounted for rotation about a center intermediate the said ends of the springs.

5. The combination with a trolley, of a spring adapted to elevate said trolley, a link connected to said spring, a supporting member, a cam shaft extending through said link and rotatably mounted on said supporting member, said cam shaft being adapted to occupy a plurality of positions to change the tension on said spring, and means for securing said shaft in any one of said positions.

6. The combination with a pantograph trolley, of springs adapted to elevate said trolley, link members connecting the adjacent ends of said springs, and a shaft having a plurality of eccentric cam surfaces connecting said link members and adapted to be rotated to change the distance between said link members.

7. The combination with a pantograph trolley, of springs adapted to elevate said trolley, link members connecting the adjacent ends of said springs, a shaft having a plurality of eccentric cam surfaces connecting said link members and adapted to occupy a plurality of positions to change the distance between said springs, and means for securing said shaft in any one of said positions.

8. The combination with a trolley, of a plurality of actuating springs each of which has one of its ends eccentrically connected to a rotatable member in such manner that rotation of the said member will regulate the tension of the springs.

In testimony whereof, I have hereunto subscribed my name this 29th day of March, 1917.

CHRISTIAN AALBORG.

Correction in Letters Patent No. 1,384,418.

It is hereby certified that in Letters Patent No. 1,384,418, granted July 12, 1921, upon the application of Christian Aalborg, of Wilkinsburg, Pennsylvania, for an improvement in "Trolleys," an error appears in the printed specification requiring correction as follows: Page 1, line 24, strike out the word "fragmentary"; and that the said Letters Patent should be read with this correction therein that the same may conform to the record of the case in the Patent Office.

Signed and sealed this 4th day of October, A. D., 1921.

[SEAL.]
KARL FENNING,
*Acting Commissioner of Patents.*